United States Patent [19]
Stephenson

[11] 3,933,291
[45] Jan. 20, 1976

[54] EAR TAG INSERTING PLIERS

[76] Inventor: Robert Edgar Stephenson, Box 16, Cayley, Alberta, Canada

[22] Filed: Apr. 29, 1974

[21] Appl. No.: 464,748

[30] Foreign Application Priority Data
Nov. 8, 1973  Canada .................................. 185720

[52] U.S. Cl. .................... 227/67; 227/19; 227/144
[51] Int. Cl.² ............................................ B25C 1/00
[58] Field of Search .......... 227/19, 67, 76, 144, 145

[56] References Cited
UNITED STATES PATENTS

| | | | |
|---|---|---|---|
| 259,067 | 6/1882 | Whittlesey et al. | 227/68 |
| 3,605,310 | 9/1971 | Brown | 227/67 |
| 3,735,908 | 5/1973 | Kinney et al. | 227/67 |
| 3,850,360 | 11/1974 | Ritchey | 227/67 |

Primary Examiner—Granville Y. Custer, Jr.
Attorney, Agent, or Firm—Stanley G. Ade

[57] ABSTRACT

The invention comprises a spring loaded plier-type holder adapted to receive an ear tag applicator on one of the jaws. The other jaw is bifurcated and consists of two centrally apertured plates between which the ear of the animal is received. Squeeze pressure on the two jaws forces the applicator together with the associated ear tag, through the aperatures in the plates and through the ear of the animal whereupon it is retained. Slots are formed in the plates to permit withdrawal of the plates from around the ear tag as the ear is disengaged from the plates. The device enables the ear tag to be inserted with one hand leaving the other hand free to control the animal.

9 Claims, 9 Drawing Figures

U.S. Patent   Jan. 20, 1976   3,933,291
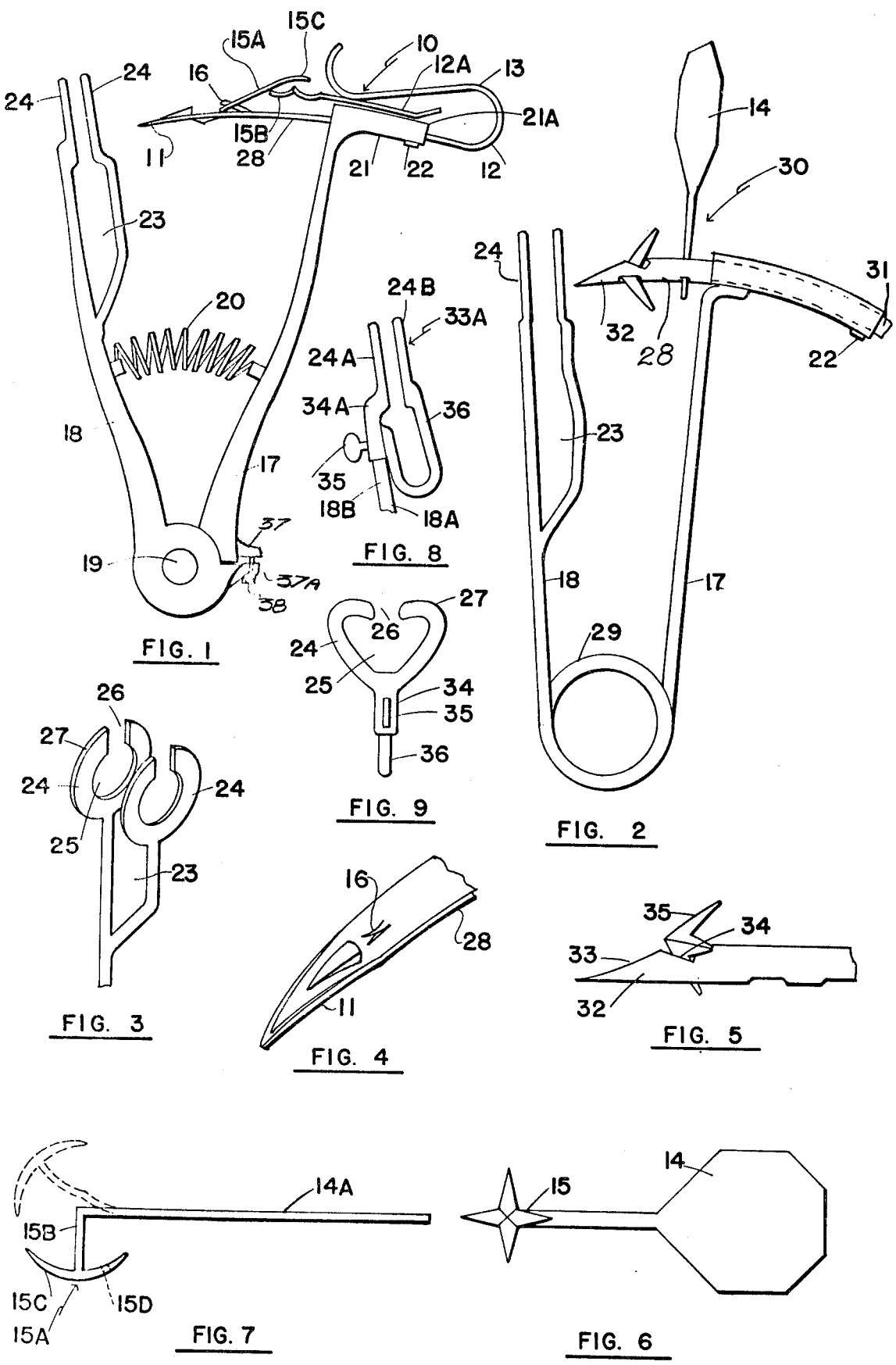

EAR TAG INSERTING PLIERS

BACKGROUND OF THE INVENTION

Flexible tags are inserted in the ears of animals for identification purposes and normally these flexible tags are detachably held on the spear end of an applicator which is grasped in one hand. The operator then attempts to hold the head of the animal still and grasp the ear in the other hand whereupon the spear portion is thrust through the thickness of the ear taking with it the tag end which remains behind when the applicator is withdrawn. As this operation is somewhat painful to the animal, violent head movements are common making it extremely difficult to insert the tags and also making it difficult to conclude the operation without damaging the animal due to these violent movements.

Although several applicators are presently on the market for holding the tags, they all suffer from the above disadvantage.

SUMMARY OF THE INVENTION

The present invention overcomes these disadvantages by providing a plier-type holder within which an ear tag applicator may be secured. The other jaw of the plier-type holder is provided with a pair of slotted plates which can be engaged, one upon each side of the ear so that squeeze pressure is all that is required to engage the tag through the ear. The jaws are spring-loaded so that the disengagement process is facilitated by the action of the spring.

The principal object and essence of the invention is therefore to provide a device of the character herewithin described which is adapted to detachably hold an ear tag applicator in one jaw thereof and to receive the ear of the animal within the other jaw so that squeeze pressure moves the jaws together thus inserting the tag into the ear readily and easily.

Another object of the invention is to provide a device of the character herewithin described which is adapted to be operated with any ear tag applicator.

Still another object of the invention is to provide a device of the character herewithin described which enables tags to be placed in ears of animals readily and easily and without undue damage occurring to the animal.

Still a further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation of one embodiment of the invention showing one type of applicator secured thereto.

FIG. 2 is a view similar to FIG. 1, but showing an alternative embodiment and an alternative applicator.

FIG. 3 is a fragmentary isometric view of one of the jaw portions of the invention.

FIG. 4 is an isometric fragmentary view of one end of one of the applicators.

FIG. 5 is a fragmentary side elevation of one end of one of the other applicators.

FIG. 6 is a plan view of one type of identification tag.

FIG. 7 is a side elevation of another type of identification tag.

FIG. 8 is a fragmentary side elevation of an alternate embodiment of the bifurcated jaw.

FIG. 9 is a view of the jaw shown in FIG. 8.

In the drawings like characters of reference indicate corresponding parts in the different figures.

DETAILED DESCRIPTION

Proceeding therefore to describe the invention in detail, reference character 10 shows one type of ear tag applicator which includes a spear portion 11 extending rearwardly to a handle 12 which curves over as indicated by reference character 13.

A tag such as that shown in FIG. 7 is made of flexible material and includes the identification portion 14A and an attaching portion 15A which is of a T design. The stem 15B is situated at right angles to the portion 14A and a flexible retainer portion 15C is situated on the distal end of the stem 15B and normally lies in a plane at right angles to the stem and substantially parallel to the portion 14A.

The portion 15C is apertured as at 15D by which it is normally hooked to a small projection 16 extending forwardly and upwardly from the spear end 11 with the identification portion normally held between the curved portion 13 and the main portion 12 of handle during the insertion process.

The invention shown in FIG. 1 includes a pair of jaws 17 and 18 pivotally secured together as at 19 and normally maintained biassed away from one another by means of a compression spring 20 reacting between the jaws as clearly shown.

The jaw 17 is provided with an arcuately curved cylindrical portion 21, on the distal end thereof, having a set screw 22 extending therethrough and the portion 12 of the applicator engages the cylindrical portion 21 and is clamped into position by means of screw 22 with the spear end directed towards the opposite jaw 18.

This opposite jaw 18 is bifurcated at the distal end as indicated by reference character 23 and the bifurcated end consists of a pair of plate members 24 maintained in spaced and parallel relationship one with the other as clearly illustrated. These plate members are centrally apertured as at 25 and an open ended slot 26 extends between the outer edges 27 of the plate portion or members to the aperture 25 as clearly illustrated in FIG. 3.

When the jaws are closed together, the spear end 11 extends through the apertures 25 and it is desirable to curve the shank 28 of the spear and handle portion 21 so that the spear follows an arc and clears the walls of the apertures 25.

In operation, a tag such as illustrated in FIG. 7, is secured to the spear 11 and extends rearwardly to be held temporarily between the upper portion 13 of the handle and the upper side 21A of the cylindrical portion 21. The plate members 24 are applied to the ear of the animal one on each side thereof and the two jaws are squeezed together thus driving the spear end 11 through the apertures 25 and through the ear of the animal between the plate members 24. The T-head end portion 15C of the tag prevents the tag from being withdrawn from the ear so that when the pressure is released upon the pliers, spring 20 forces the jaws apart and withdraws the spear end 11 with the tag being drawn from the spear end and from between the portion 13 of the handle and the cylinder 21 so that the tag is installed on a permanent basis within the ear of the animal.

FIGS. 2 and 5 show an alternative embodiment and although the construction is similar, it is shown with a further type of applicator. However, it should be appreciated that either applicator can be used in either embodiment.

In this embodiment, handles 18 and 17 are formed in one piece and joined at the inner ends thereof by means of a hair pin spring portion 29 which takes the place of spring 20 and normally biasses the two jaws apart.

The applicantor collectively designated 30 in this embodiment consists of a barrel-type handle 31 which is engaged within cylinder 21 and held by set screw 22 as hereinbefore described.

The spear end 32 of this applicator is also a hollow cylinder, but is cut away as indicated by reference character 33 and as shown in detail in FIG. 5. A notch 34 is provided for receiving the arrow-head end 15 of a tag of the type shown in FIG. 6. The operation is similar to that hereinbefore described with the spear end 32 driving through the ear held between the plate members 24 and leaving the tag in position when the pliers are withdrawn.

As hereinbefore described, FIG. 7 shows an alternative type of tag with the identification portion 14A and a flexible attaching portion 15A, situated as illustrated in FIG. 7. However, this can be moved over to the position shown in phantom for insertion within the ear of the animal.

With either embodiment, once the tag has been installed, it is necessary to withdraw the plate members 24 from the ear and the slots 26 enable the plate members to be disengaged from the shank of the tag which, of course, is now installed through the ear of the animal.

The use of the present invention permits the head to be held firmly by one arm with the applicator situated within the holder being operable with one hand readily and easily.

However, when used with relatively large animals it is necessary to hold them in a conventional squeeze box or the like.

FIGS. 8 and 9 show an alternative embodiment in which the one end of the jaw 18A is in the form of a detachable component collectively designated 33A. In this embodiment, the portion 18B of the jaw 18A is cylindrical in configuration and the member 33A includes a cylindrical sleeve 34A which engages over the end 18B and is detachably secured thereto by means of a thumb-type set screw 35. The plate members 24A and 24B are situated in a similar relationship to the plate members 24 shown in the previous embodiment. However, plate member 24B is held in the spaced and parallel relationship with the plate member 24A by means of a curved member 36 which extends from the cylindrical sleeve portion 34A as clearly illustrated in FIG. 8.

This particular embodiment enables a variety of shapes of plate members to be formed to suit various applicators and it is a simple matter to replace one with the other when desired.

Finally, note should be made of the jaw adjustment feature illustrated in FIG. 1. A projecting lug 37 and 37A is formed on each jaw 17 and 18 adjacent the hinge or pivot 19 and in opposition one with the other. A set screw 38 is screw threadably engaged through lug 37A and bears against lug 37. This adjustment is desirable on the device when more than one type of applicator is to be used having different stroke lengths for operation. The adjustment permits the minimum necessary length of stroke to be set for each applicator.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An applicator holder for facilitating the insertion of ear tags through ears of animals in conjunction with an applicator which includes a handle portion, an ear piercing spear on said handle portion and means on said spear to detachably hold one end of a flexible identification tag during insertion; said holder including a first jaw portion, means on one end of said first jaw portion to detachably retain said applicator, a second jaw portion, ear receiving means on one end of said second jaw portion to detachably receive the ear of the animal, means for rotationally connecting said first jaw portion to said second jaw portion at a location spaced from the respective said one ends thereof, for relative approaching movement between said one first ends of said jaw portions, and spring means extending between and normally biassing said one ends of said first and second jaw portions apart, whereby when said one end of said jaw portions are moved toward one another against the pressure of said spring means the spear of said applicator will pierce the ear of the animal and extend through said ear receiving means on said one end of said second jaw portion.

2. The holder according to claim 1 in which said means on said one end of said second jaw portion includes a bifurcated end comprising a pair of spaced and parallel apertured plate members, the ear of the animal being received between said plate members.

3. The holder according to claim 2 including open ended slots extending between the outer edges of said plate members and the apertures formed therein whereby the tag passes through said slots when said applicator is disengaged from the ear of the animal.

4. The holder according to claim 3 in which said means on said one end of said first jaw portion includes an arcuately curved clamp receiving the handle of said applicator and means to detachably hold said handle in said clamp.

5. The holder according to claim 1 in which said means on said one end of said first jaw portion includes an arcuately curved clamp receiving the handle of said applicator and means to detachably hold said handle in said clamp.

6. The holder according to claim 2 in which said means on said one end of said first jaw portion includes an arcuately curved clamp receiving the handle of said applicator and means to detachably hold said handle in said clamp.

7. The holder according to claim 1 in which said ear receiving means on the one end of said second jaw portion is detachably secured to said one end.

8. The holder according to claim 7 in which said last mentioned means includes a jaw portion engaging member, means to detachably secure said member to said one end of said second jaw portion, comprising a pair of spaced and parallel apertured plate members, the ear of the animal being received between said plate members.

9. The holder according to claim 8 including open ended slots extending between the outer edges of said plate members and the apertures formed therein whereby the tag passes through said slots when said applicator is disengaged from the ear of the animal.

* * * * *